United States Patent [19]

Ohmori et al.

[11] Patent Number: 4,569,871
[45] Date of Patent: Feb. 11, 1986

[54] MATERIAL FOR OPTICAL DISKS

[75] Inventors: Akira Ohmori; Kazuo Ishiwari, both of Ibaraki, Japan

[73] Assignee: Daikin Kogyo Co., Ltd., Japan

[21] Appl. No.: 708,822

[22] Filed: Mar. 6, 1985

[30] Foreign Application Priority Data

Mar. 9, 1984 [JP] Japan ................... 59-46184

[51] Int. Cl.$^4$ ............................ B32B 1/00; G11B 3/70
[52] U.S. Cl. ......................... 428/64; 428/65;
369/288; 430/271; 430/945; 346/137
[58] Field of Search .................. 428/64, 65, 421, 422;
369/288, 286; 430/271, 945; 346/137

[56] References Cited

U.S. PATENT DOCUMENTS 4,310,919  1/1982  Slaten ............................... 369/286 X

FOREIGN PATENT DOCUMENTS 121150  7/1983  Japan .

Primary Examiner—Alexander S. Thomas
Attorney, Agent, or Firm—Larson and Taylor

[57] ABSTRACT

A material for optical disks which comprises a polymer containing at least 20 wt. % of a structural unit represented by the formula

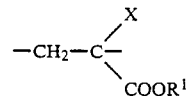

wherein X is fluorine or alkyl having 1 to 6 carbon atoms, and $R^1$ is fluoroalkyl having 2 to 10 carbon atoms.

2 Claims, No Drawings

MATERIAL FOR OPTICAL DISKS

The present invention relates to a material for optical disks.

Polycarbonate resin and a certain type of acrylic resin are generally used as materials for optical disks.

Polycarbonate resin has a low hygroscopicity which is suitable for the material for optical disks. However, polycarbonate resin has the problem of being easily susceptible to scratches and birefringence.

Acrylic resin is not easily scratched and less liable to birefringence but has a high hygroscopicity which leads to swelling of the resin.

Accordingly, the main object of the present invention is to provide a novel material for optical disks which is low in hygroscopicity and less susceptible to hygroscopic swelling.

Another object of the present invention is to provide a novel material for optical disks which is not easily scratched and less liable to birefringence.

The above object can be fulfilled by using as a material for optical disks a specific polymer containing at least 20 wt. % of a structural unit represented by the formula

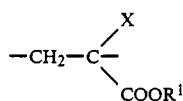   (a)

wherein X is fluorine or alkyl having 1 to 6 carbon atoms, and $R^1$ is fluoroalkyl having 2 to 10 carbon atoms.

It is required that the polymer contain at least 20 wt. % of the structural unit (a) so as to have a reduced water absorbing property and to be smaller in dimensional changes on absorption of water when the polymer is used as a material for optical disks.

Usually, the polymer, which contains at least 20 wt. % of the structural unit (a), may further contain up to 80 wt. % of a structural unit represented by the formula

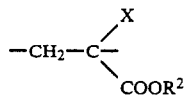   (b)

wherein X is as defined above, and $R^2$ is alkyl having 1 to 20 carbon atoms.

The polymer containing such structural unit (a) or units (a) and (b) can be prepared usually by polymerizing a monomer represented by the formula

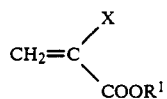

wherein X and $R^1$ are as defined above, or by polymerizing the monomer with a monomer represented by the formula

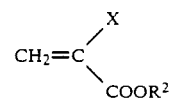

wherein X and $R^2$ are as defined above.

Other ethylenically unsaturated monomers may be copolymerized with these monomers insofar as the resulting polymer retains the properties desirable for use as a material for optical disks.

The polymer is prepared usually by solution, suspension, emulsion or block polymerization.

The polymerization temperature is usually 0° to 150° C. and the reaction pressure is 0.5 to 5 kg/cm$^2$G when any of these polymerization methods is resorted to.

Examples of media useful for suspension polymerization are water, 1,1,2-trichloro-1,2,2-trifluoroethane and 1,2-dichloro-1,1,2,2-tetrafluoroethane, which may be used singly or in admixture. Examples of media useful for solution polymerization are methyl ethyl ketone, ethyl acetate, butyl acetate, etc. Useful polymerization initiators for emulsion polymerization are redox initiators comprising oxidizing agents such as ammonium persulfate, reducing agents such as sodium sulfite and a salt of transition metal such as ferric sulfate. Initiators useful for suspension or solution polymerization are azo compounds and organic peroxides such as azobisisobutyronitrile, isobutyryl peroxide, octanoyl peroxide, etc.

Examples of useful emulsifiers for emulsion polymerization are ammonium salts, sodium salts and the like of perfluorocarboxylic acid, ω-hydroperfluorocarboxylic acid, etc.

The polymer obtained by the above polymerization process and useful for the material for optical disks has a molecular weight ranging from about 10,000 to about 1,000,000, preferably about 50,000 to about 300,000, as measured by gel permeation chromatography using polystyrene as a standard, melt index of about 0.1 to about 80 (in terms of gram) as measured by forcing out the polymer at 230° C. through a nozzle, 2.1 mm in inside diameter and 8 mm in length, with the piston under a load of 7 kg, glass transition temperature of about 80° to about 150° C., refractive index of about 1.33 to about 1.47 and light transmittance of more than 80% when a sheet of 3 mm in thickness is tested with a light having a wavelength of 600 nm.

The material of the present invention can be made into optical disks and is also usable for coating conventional optical disks.

Examples and comparison examples are given below.

EXAMPLES 1–7 AND COMPARISON EXAMPLE 1

Into a 2-liter four-necked flask were placed 100 parts by weight of the monomer or monomers (combined amount) listed in Table 1, 1 part by weight of azobisisobutyronitrile and 500 parts by weight of ethyl acetate, and the resulting solution was maintained at 60° C. for 5 hours with stirring for polymerization. The reaction mixture was added dropwise to petroleum ether, causing the resulting polymer to precipitate. The polymer was then collected and dried at a reduced pressure of 20 mm Hg at 80° C. for 16 hours. The dry polymer was heated at 220° C. and pressed at a pressure of 20 kg/cm$^2$ into a plate, 70 mm in length, 10 mm in width and 3 mm in thickness. The plate was immersed in water maintained at 23° C., for 24 hours and then checked for water absorption and percent dimensional change on absorption of water (by the method of ASTM D 570). Table 1 shows the results.

EXAMPLE 8

A dry polymer was prepared by the same polymerization and drying procedures as in Example 1. The dry polymer was dissolved in ethyl acetate to a concentration of 3 wt. %. A 1-mm-thick panel of polymethyl methacrylate was immersed in the solution to coat the panel with the polymer. The coating was dried to obtain a specimen, which was thereafter checked for water absorption and percent dimensional change on absorption of water in the same manner as above. Table 1 shows the results. When the dry specimen was cut and the section was microscopically observed, the coating was found to have a thickness of 10 to 12 μm.

The melt index (MI), glass transition temperature (Tg), refractive index and light transmittance given in Table 1 were measured by the following methods.

MI: The polymer was placed into the cylinder, 9.5 mm in inside diameter, of Koka flow tester (product of Shimadzu Seisakusho Ltd.), maintained at 230° C. for 5 minutes and thereafter forced out through a nozzle, 2.1 mm in inside diameter and 8 mm in length, by the piston under a load of 7 kg. The weight of polymer discharged in 10 minutes was measured. MI is expressed in the number of grams.

Tg: The polymer was heated at a rate of 20° C./min by a differential scanning calorimeter, and the temperature (°C.) at which the polymer started to absorb heat was measured as the Tg value of the polymer. Refractive index: Measured at 25° C. by Abbe's refractometer. Light transmittance: Measured by the method of ASTM D 1003.

The symbols given in Table 1 represent the following monomers.

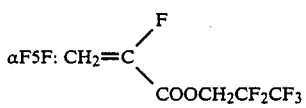

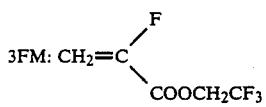

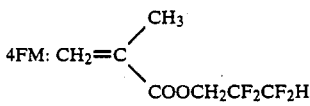

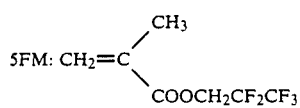

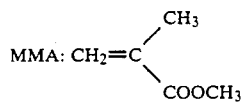

TABLE 1

| | Monomer (parts by weight) | | Water absorption (%) | % Dimensional change on absorption of water | MI (g) | Tg (°C.) | Refractive index | Light transmittance | Molecular weight |
|---|---|---|---|---|---|---|---|---|---|
| Ex. 1 | αF5F | (100) | 0.01 | 0.01 | 14 | 101 | 1.366 | 93 | 340,000 |
| Ex. 2 | 3FM | (100) | 0.09 | 0.1 | 25 | 82 | 1.415 | 92 | 180,000 |
| Ex. 3 | 4FM | (100) | 0.16 | 0.03 | 30 | 80 | 1.422 | 91 | 200,000 |
| Ex. 4 | 5FM | (100) | 0.08 | 0.03 | 41 | 77 | 1.392 | 93 | 160,000 |
| Ex. 5 | αF5F MMA | (86) and (14) | 0.05 | 0.01 | 8 | 102 | 1.375 | 93 | 240,000 |
| Ex. 6 | αF5F MMA | (62) and (38) | 0.4 | 0.05 | 26 | 107 | 1.396 | 92 | 210,000 |
| Ex. 7 | αF5F MMA | (25) and (75) | 0.7 | 0.08 | 101 | 112 | 1.438 | 92 | 180,000 |
| Comp. Ex. | MMA | (100) | 2.0 | 0.2 | 51 | 123 | 1.490 | 93 | 130,000 |
| Ex. 8 | αF5F | (100) | 0.01 | 0.01 | 14 | 101 | 1.366 | 93 | 320,000 |

EXAMPLES 9 AND 10, AND COMPARISON EXAMPLE 2

The same polymers as prepared in Examples 1, 4 and Comparison Example 1 were used for Examples 9, 10 and Comparison Example 2, respectively. Each of the polymers was heated at 220° C. and pressed into a disk, 45 mm in diameter and 2 mm in thickness, under a pressure of 20 kg/cm$^2$.

The index of birefringence of the central portion of the disk was measured at a wavelength of 546 nm with use of a polarizing microscope (OPTIPHOT-POL, product of Nippon Kogaku K.K.) and a Sénarmont compensator. The index values for Example 9, 10 and Comparison Example 2 were $7.0 \times 10^{-5}$, $7.7 \times 10^{-5}$ and $8.3 \times 10^{-5}$, respectively. Thus, the specimens of Examples were lower than that of Comparison Example in index of birefringence.

We claim:

1. An optical disk prepared from the material comprising a polymer containing at least 20 weight percent of a structural unit represented by the formula

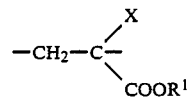

wherein X is fluorine or alkyl having 1 to 6 carbon atoms, and R$^1$ is fluoroalkyl having 2 to 10 carbon atoms.

2. An optical disk as defined in claim 1 wherein the polymer contains up to 80 weight percent of a structural unit represented by the formula

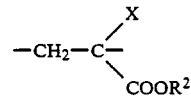

wherein X is fluorine or alkyl having 1 to 6 carbon atoms, and R$^2$ is alkyl having 1 to 20 carbon atoms.

* * * * *